United States Patent [19]
Kienle

[11] 3,987,551
[45] Oct. 26, 1976

[54] APPARATUS FOR MEASURING CONTINUOUS OR DISCONTINUOUS SURFACES

[75] Inventor: Max Kienle, Lausanne, Switzerland

[73] Assignee: Tesa S.A., Renens, Switzerland

[22] Filed: May 19, 1975

[21] Appl. No.: 578,470

Related U.S. Application Data

[63] Continuation of Ser. No. 428,874, Dec. 27, 1973, abandoned.

[30] Foreign Application Priority Data

Jan. 6, 1973  Switzerland............................. 95/73

[52] U.S. Cl. .......................... 33/169 R; 33/172 E; 33/174 L; 33/DIG. 5; 33/174 Q
[51] Int. Cl.² ......................................... G01B 7/34
[58] Field of Search........... 33/169 R, 172 E, 169 F, 33/143 L, 148 H, DIG. 5, DIG. 8, 147 N, 147 F, 174 L, 174 Q

[56] References Cited
UNITED STATES PATENTS 3,717,934  2/1973  Ishikawa............................. 33/174 L
3,844,047  10/1974  Carson............................. 33/147 N

*Primary Examiner*—Richard E. Aegerter
*Assistant Examiner*—Willis Little
*Attorney, Agent, or Firm*—Anthony J. Casella

[57] ABSTRACT

A method of measuring dimensions of parts having a continuous or discontinuous surface during the course of the machining. This process has the feature that the displacements of a measurement sensor are mechanized, that the mechanized displacement of the said measurement sensor is controlled in such a manner that it gradually approaches the surface to be measured and comes into contact with it, that the dimension measured at the moment of contact is recorded, and that the sensor is maintained at the measured dimension or the sensor is moved in the opposite direction for a predetermined period of time before starting a new cycle of approach of the sensor to effect a new contact with the surface to be measured and recording the measured dimension at the time of said new contact. The invention also relates to a device for the performing of this method.

4 Claims, 7 Drawing Figures

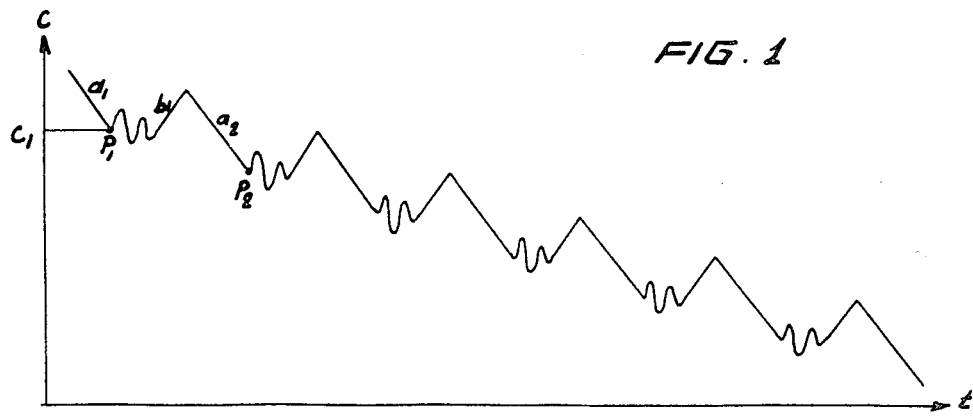
FIG. 1
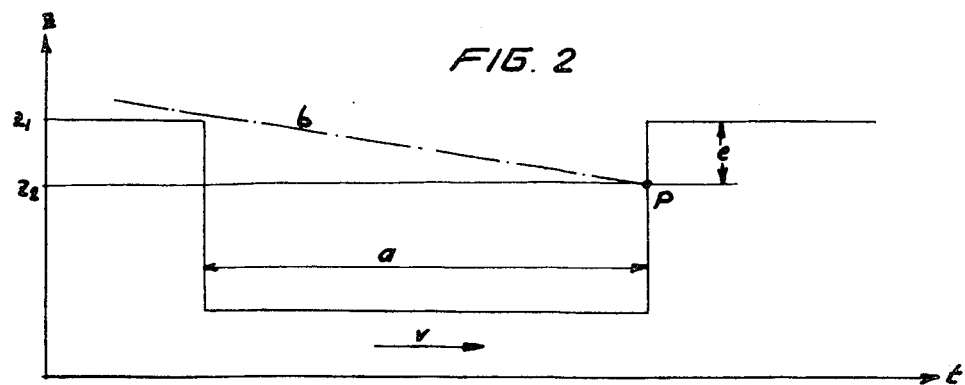
FIG. 2
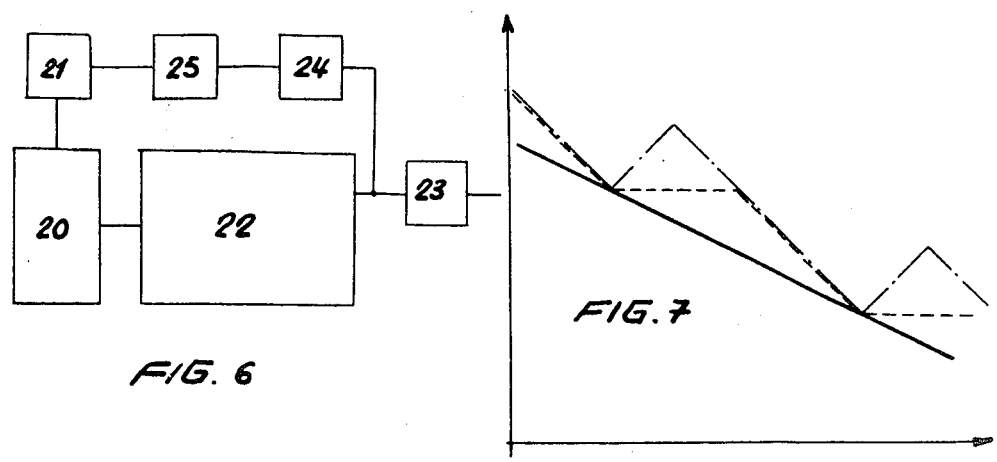
FIG. 6
FIG. 7

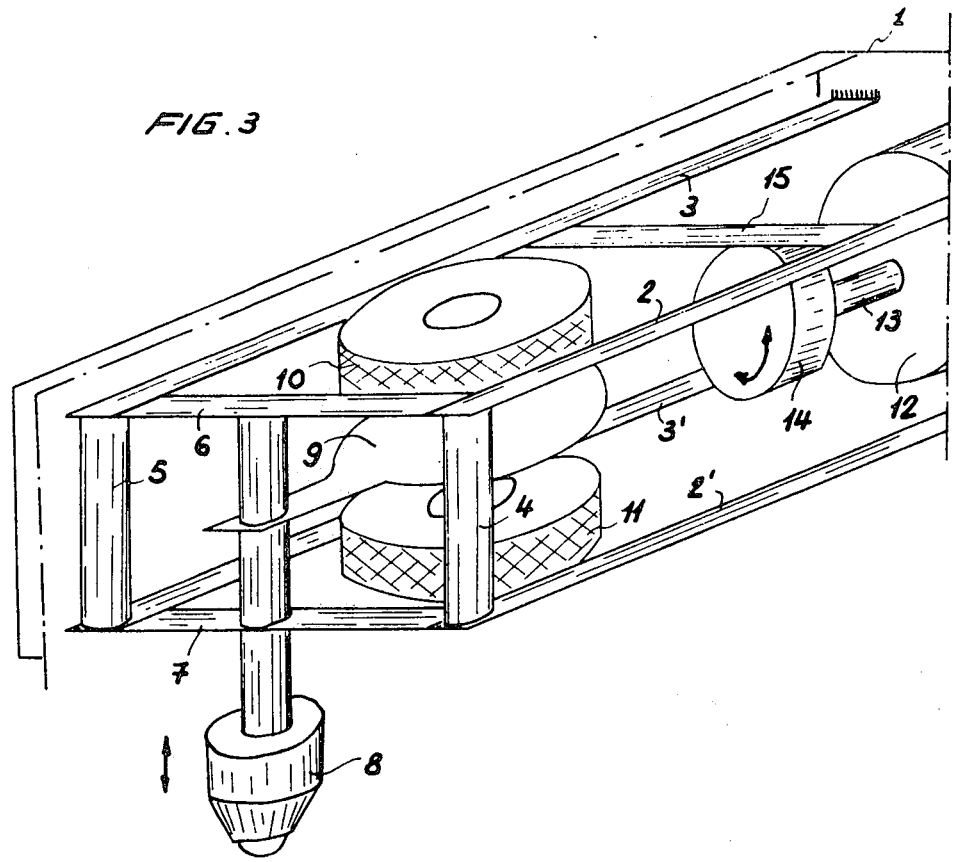
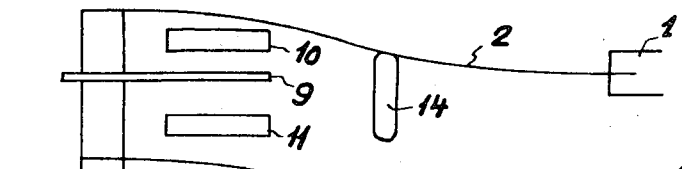
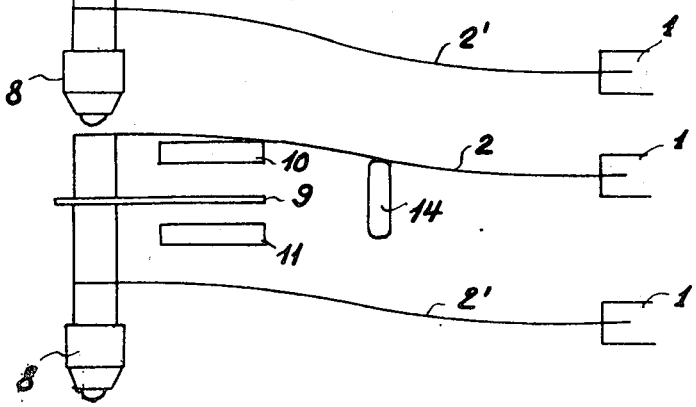

APPARATUS FOR MEASURING CONTINUOUS OR DISCONTINUOUS SURFACES

This is a continuation of application Ser. No. 428,874 filed Dec. 27, 1973 now abandoned.

Various apparatus are already known for measuring the dimensions of parts having a continuous or discontinuous surface during the course of machining, such as, for instance, measuring the diameter of a workpiece having an interrupted surface on a grinding machine.

These apparatus generally comprise a measurement sensor mounted on a movable feeler arm which actuates measurement transducing means. The measurement sensor being in constant contact with the workpiece to be measured, it vibrates and the information transmitted to the transducing means by the feeler arm is imprecise or entirely erroneous. It has been attempted to overcome this situation by subjecting the feeler arm to the action of a movement damper which permits the arm in question to remain in any position which it occupies, which makes it possible to eliminate the vibrations to a large extent, but results in substantial inertia of the feeler arm bringing about a mechanical time constant, and the danger of deformation of said feeler arm when the workpiece to be measured has an irregular surface.

In order to remedy these drawbacks, the objects of the present invention is a method of measuring dimensions of workpieces having a continuous or discontinuous surface during the course of machining, characterized by the fact that the displacements of a measurement sensor are motorized, that the motorized displacement of the said measurement sensor is controlled in such a manner that it progressively approaches the surface to be measured and comes into contact with it, by the fact that the dimension measured at the time of contact is recorded, and by the fact that the sensor is maintained, the measured dimension or the measurement sensor is displaced in opposite direction for a predetermined period of time before starting a new cycle of approach of the sensor for a new contact with the surface to be measured and registration of the measured dimension at the moment of this new contact.

Another object of the invention is a device for the carrying out of said method.

This device is characterized by the fact that it comprises a measurement sensor which is movable in one direction and in the opposite direction under the action of a drive means a transducer whose movable element is rigidly connected with the said measurement sensor, a means for recording signals given off by the transducer, and a means for controlling the drive means of the measurement sensor.

The accompanying drawing illustrates the method and shows one embodiment of the device schematically by way of example.

FIG. 1 shows the path of the measurement sensor.
FIG. 2 is an explanatory diagram.
FIG. 3 is a diagrammatic perspective view of the device.
FIGS. 4 and 5 are diagrams serving to explain the operation of the device of FIG. 3.
FIG. 6 is a block diagram of a control circuit for the device.
FIG. 7 is an explanatory diagram.

In FIG. 1, there is shown as abscissa the time $t$, and as ordinate the displacements of the measurement sensor. There can be noted the initial phase $a_1$ of approach of the sensor and the point of contact $P_1$ corresponding to a dimension $c_1$, the value of which dimension is recorded. It is seen that as a result of the contact at point $P_1$, the sensor is going to oscillate. This oscillation, however, will not have any effect on the measurement, since the dimension recorded is that of the point of contact $P_1$, namely before any oscillation of the sensor. By displacing the sensor in opposite direction for a predetermined period of time, phase $b_1$, the sensor can be stabilized before starting a new approach phase $a_2$ leading to a new contact $P_2$, and so on. This form of application of the method is particularly suitable for measurement, in the course of the machining, of the dimensions of workpieces having discontinuous surfaces since, due to the phase of removal of the sensor, one avoids the risks of damaging the latter, particularly during its oscillation phase.

In the event that the workpiece to be measured has a smooth surface, as soon as the contact has been effected and the dimension of the point of contact recorded, the sensor can be kept at this dimension for a predetermined period of time so as to enable it to stabilize itself before starting a new cycle of approach, contact and recording of the dimension measured at the new point of contact.

In both cases, the sensor is not continuously in contact with the workpiece being machined, and one thus eliminates errors in measurement due to vibrations of the workpiece and of the machine tool.

It is contemplated to vary the speed of approach of the measurement sensor. With due consideration of the desired precision of measurement, the speed of approach of the sensor will advantageously be a function of the speed of displacement of the workpiece during the course of machining and of its profile. This is illustrated in FIG. 2 in which there is shown a workpiece in the form of crenellations moving at a speed $v$, the crenellations of which are separated by a distance $a$. As abscissa there is shown the time $t$, while the dimensions $z$ are shown as ordinate. There can also be noted the path $b$ of the measurement sensor and the point of contact P at a dimension $z_2$ less than the exact dimension $z_1$. The distance $e$ between the dimensions $z_1$ and $z_2$ is the measurement error of the sensor, due to the fact that the latter has come into contact with the workpiece between two crenellations. This error $e$, which must be less than the desired precision of measurement, depends on the speed of displacement of the sensor. Thus in the example shown it is seen that the time used by the sensor to pass from level $z_1$ to level $z_2$ is equal to $a/v$. If a precision of measurement of $1\mu$ is desired, the speed of approach of the sensor $V_t$ will be:

$$V_t \leq \frac{e}{\frac{a}{v}} = e\left(\frac{v}{a}\right)$$

As indicated previously, it will be advantageous to make the speed of approach of the sensor vary as a function of the desired precision of measurement of the speed of displacement of the work being machined and of its profile. In addition to these factors, the speed of machining will be taken into account. As a matter of fact, if the speed of approach of the sensor is less than the speed of machining, the contact will not be obtained and any measurement will be impossible. It is therefore necessary for the speed of approach of the sensor to be substantially greater than the speed of machining. Furthermore, taking into account the speed of approach of the sensor, the time during which the sensor is maintained at the dimension reached or displaced in opposite direction will be modified.

The device shown schematically in FIG. 3 comprises a support partially shown at 1 and in which there are fixed two pairs of deformable blades 2,2' and 3,3'. The ends of the blades 2,2' are connected together by a bar 4, while the ends of the blades 3,3' are connected together by a bar 5, each of the pairs of blades forming with its connecting bar a fixed parallelogram.

The ends of the blades 2 and 3 are connected by a tongue 6 and the ends of the blades 2' and 3' are connected by a tongue 7. The tongues 6 and 7 bear a measurement sensor 8 on which there is fastened a plate 9 which extends between the coils 10 and 11 of a transducer arranged in the body 1, the said coils 10 and 11 being arranged between the parallelograms formed by the blades 2,2' and 3,3' respectively and the plate 9 constituting the movable element of the said transducer.

In the support 1 there is arranged an electric micromotor 12 whose direction of operation can be reversed and whose shaft 13 bears a cam 14 against which there rests a rigid rest support 15 fastened to the blades 2 and 3 and extending between them.

This device operates in the following manner (FIGS. 4 and 5): when the motor 12 is rotating, it drives the cam 14 and the rest support 15 which is in contact with the cam 14 moves and drives the parallelograms formed by the blades and bars 2,2',4 and 3,3',5. The displacement of these parallelograms causes the displacement of the sensor 8 and therefore of the plate 9 between the coils 10 and 11 of the transducer. When the direction of operation of the motor 12 is reversed, the movement of the cam 14 will be reversed and the rest support will move in opposite direction and will accordingly drive the sensor 8 and the plate 9. Thus the reversing of the direction of operation of the motor will cause the reversal of the direction of displacement of the sensor.

FIG. 6 is a block diagram of an electronic system controlling the device in accordance with the method. In this diagram, 20 represents the transducer connected to the motor 21 and connected, via suitable amplifying and decoding circuits 22, with a memory 23. A pulse-detector circuit 24 is connected between the transducer 20 and the memory 23. This pulse detector 24 acts on a control element 25 (for instance a monostable flip-flop adjustable in time) controlling the running of the motor 21.

FIG. 7 shows the path of the sensor and the signal obtained after recording of the dimension at each of the points of contact. The heavy dotted line represents the variation in the dimension as a function of time (the times being entered as abscissas and the dimension as ordinates), the dashed line represents the path of the sensor, and the dotted line represents the signal obtained after storage.

What is claimed is:
1. A device for measuring the dimensions of workpieces having a continuous or discontinuous surface during the course of machining, comprising a measurement sensor movable in one direction and in the opposite direction,
   a. a motor means for the motorized drive of said measurement sensor in one direction and in the opposite direction;
   b. a transducer whose movable element is rigidly connected with said measurement sensor,
   c. a recording means connected to said transducer for recording the signals emitted by said transducer;
   d. a pulse-detector means connected between said transducer and said recording means for controlling the running of said motor means; and
   e. a control means on which acts said pulse-detector means, said control means controlling said motor means, whereby said measurement sensor may gradually approach the surface to be measured and enter into contact with it and the dimension measured at the time of contact recorded, and the measurement sensor maintained at the dimension measured and recorded at said time of contact or displaced in the opposite direction for a period of time.

2. A device according to claim 1, wherein said motor means is a motor whose direction of operation is reversible.

3. A device according to claim 1, wherein said control means controlling said motor means is adjustable in time.

4. A device according to claim 3, wherein said control means is a mono-stable flip-flop adjustable in time.

* * * * *